United States Patent
Habermann

(10) Patent No.: US 7,410,253 B2
(45) Date of Patent: *Aug. 12, 2008

(54) SPECTACLES

(75) Inventor: Gert Habermann, Munich (DE)

(73) Assignee: ic! berlin brillenproduktions GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/559,075

(22) Filed: Nov. 13, 2006

(65) Prior Publication Data

US 2007/0121060 A1 May 31, 2007

Related U.S. Application Data

(63) Continuation of application No. PCT/DE2005/000865, filed on May 10, 2005, and a continuation of application No. 11/125,793, filed on May 10, 2005, now Pat. No. 7,344,242.

(51) Int. Cl.
*G02C 5/22* (2006.01)
(52) U.S. Cl. ......................... 351/153; 16/228
(58) Field of Classification Search ............. 351/153, 351/140, 111, 113, 114, 41, 158; 16/228
See application file for complete search history.

(56) References Cited

U.S. PATENT DOCUMENTS 3,155,982 A * 11/1964 Baratelli ..................... 2/12
3,744,887 A 7/1973 Dunbar
4,978,209 A 12/1990 Ohba
5,532,766 A 7/1996 Mateer et al.
5,847,801 A * 12/1998 Masunaga ................. 351/153

FOREIGN PATENT DOCUMENTS

| DE | 8902196 | 5/1989 |
|---|---|---|
| EP | 0863424 | 9/1998 |
| FR | 954467 | 1/1950 |
| FR | 2779241 | 12/1999 |
| GB | 2034072 | 5/1980 |
| WO | WO9848314 | 10/1998 |
| WO | 0067067 | 11/2000 |

* cited by examiner

*Primary Examiner*—Hung X Dang
(74) *Attorney, Agent, or Firm*—Grossman Tucker Perreault & Pfleger, PLLC

(57) ABSTRACT

The invention relates to a spectacle frame with a rim (1) and with one temple (2) each left and right of it hinged to a connecting element (6) of the rim (1). The temple (2), at its mount proximal end, is provided with three leaf springs (3, 4, 5). The two outer leaf springs (3, 4) comprise hinge elements (10) with which hinge elements (9) of the connecting element (6) interact, thereby forming a swivel joint. When the temple (2) is folded in, the outer leaf springs (3, 4) of the temple (2) are displaced outward from the plane of the connecting element (6) via an abutment (11) of the connecting element (6) for the center leaf spring (5) of the temple (2).

16 Claims, 2 Drawing Sheets

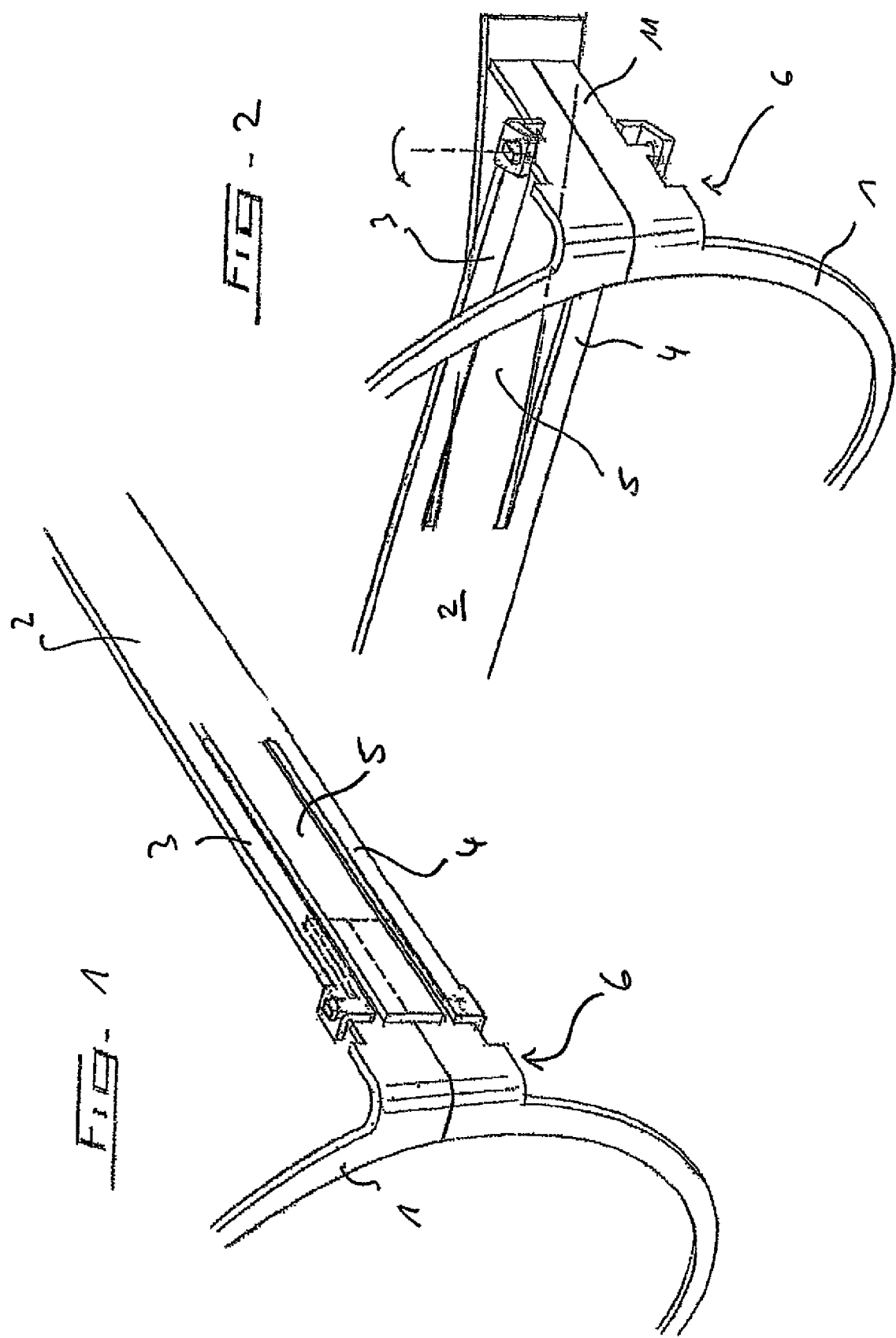

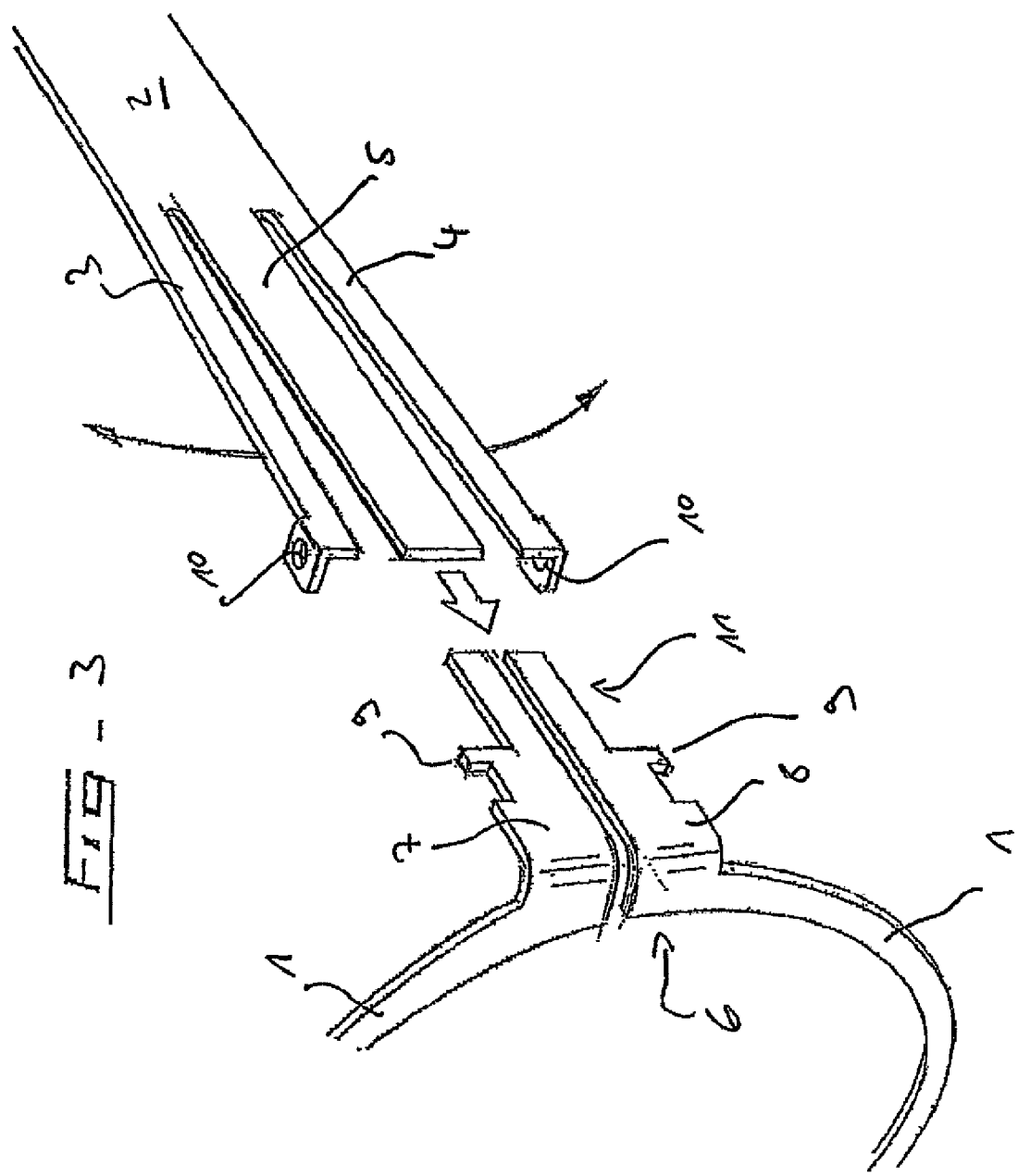

SPECTACLES

CROSS REFERENCE TO RELATED APPLICATION

This application is a continuation of International Application PCT/DE2005/000865, with an international filing date of May 10, 2005, and is a continuation of U.S. patent application Ser. No. 11/125,793, filed on May 10, 2005, now U.S. Pat. No. 7,344,242 both of which are fully incorporated herein by reference.

TECHNICAL FIELD

The present invention relates to glasses or respectively a glasses frame, in which screws for the joint mechanism are not necessary, as well as its components.

BACKGROUND INFORMATION

Different types of joint mechanisms for glasses frames are known. The most common type is based on a hinge mechanism in which pins are disposed on the frame or respectively the rim of the lenses, which cooperate with a respective hinge which is disposed at the end on the side of the temple which is on the side of the rim by interleaving both parts and by connecting them by means of special screws such that they are pivotable. In most glasses rims, in particular in those which are used with corrective glasses, opening and closing the rims for inserting or for changing the lenses is carried out by means of a so-called closing block. The lenses can also be directly attached to a frame by screwing screws directly into the lens. In glasses without a frame, the temples are directly screwed with the lenses by means of a projecting part.

Since the swivel joint is subject to high dynamic loads during lifetime of the glasses, in several solutions, no traditional swivel joint is used for reasons of simplification.

Thus, the U.S. Pat. No. 3,155,982 proposes glasses in which the temples directly cooperate with the front part of the rim which contains the lenses. Therefore, the end of the temple which is on the side of the rim is divided into three leaf springs, wherein the central leaf spring abuts on the external edge of the rim part, whereas the two external leaf springs engage with openings disposed near the external edge in the central piece by means of hooks formed at their ends. A disadvantage of the joint mechanism described in U.S. Pat. No. 3,155,982 is the fact that the glasses temples are only attached to the rim very loosely such that the glasses temples can be loosened from the holder very easily, e. g. when the glasses fall on the floor.

Another solution for a glasses joint which as well uses a glasses temple which is provided with three leaf springs is proposed in the European Patent No. 0 863 424 B1 of Haffmans and Gottschling. On the rim, respectively one connecting element is provided on the left and on the right, which has an upper and a lower recess which forms a joint axis which is perpendicular to the direction of the temple in its folded-up state. In the folded-up state of the temples, the two external leaf springs of the temples engage with the recesses in the connecting element from the surface of the connecting element which is faced to the face of the wearer of the glasses by means of curved shapes which are provided on their free ends and then abut on the surface of the connecting element which is not faced to the face of the wearer of the glasses, whereas the central leaf spring abuts with its entire length on the opposite surface of the connecting element. The connecting element therein is divided in two pieces; thus, it is easily possible to change the lenses. For stabilization, a closing clip can be used which can be pushed over the two-piece connecting element. This mechanism however has the disadvantage that inserting the temples is difficult since the external leaf springs and the central leaf spring have to be guided on opposite surfaces of the connecting element, wherein this operation has to be effected by moving against the resilience and the curved shapes of the ends are disturbing. Furthermore, in particular if the dimensions of this joint are very small, there is a risk that the temples are detached from the connecting element even in the case of low mechanical load.

From the French publication FR 2 779 241, a glasses frame having a glasses joint is known which is achieved by providing with pins the end of the temple on the side of the rim, which engage with recesses of a connecting element on the rim, wherein clips of the connecting element overlap the end on the side of the rim when the temple is swivelled. Such a joint however does not assure a safe holding of the temple in the case of excessive mechanical load.

U.S. Pat. No. 3,458,866 describes protective goggles in which the temple has a slit which is substantially vertical, in which a lateral connecting element of the frame is locked such that it is pivotable. The front end of the temple encloses the connecting element. Such design is destined, as typical for protective goggles, to achieve an easy and fast mounting or respectively dismounting of the temple and therefore is not appropriate for optical glasses.

SUMMARY

Based on the foregoing, one objective of the present invention to provide a glasses frame which makes possible an easy mounting of the temples and in which an unintended detaching of the glasses temples in case of mechanic load of the glasses is prevented.

Thus, the temples of the glasses frame on their end on the side of the rim have three leaf springs which are substantially parallel in their longitudinal direction, wherein the external ones of the three leaf spring on their ends have joint elements, which are disposed relative to joint elements of the connecting element such that when the temple is folded in, the outer leaf springs are being swivelled over an abutment of the connecting element or respectively are being moved out of the surface plane of the connecting element. The connecting element which is designed as a flat surface therefore is designed such that it tapers in direction of the temple behind the joint element, wherein the tapering section forms an abutment for the central one of the three leaf springs of the respective temple when the temple is folded in.

Such design has the advantage that all three leaf springs abut on the surface of the connecting element which is not faced to the face of the glasses wearer, such that a common plane end region is formed. Furthermore, the fact that the external leaf springs as well as the central leaf spring abut on the external surface of the connecting element, enables an easy mounting, since the leaf springs do not have to be guided on opposite surfaces of the connecting element.

Although these leaf springs abut on a common surface, the design of the glasses frame with joint elements which are being attached to the external leaf springs enables the formation of a spring mechanism which supports the folding-in or respectively folding-up of the temples.

The spring mechanism results form the fact that the central leaf spring is supported on the tapering section of the connecting element which extends in direction of the temple and thus forms the abutment, whereas the external ones of the three leaf springs are provided with the joint elements. Here, the maximum width of the central leaf spring corresponds to the width of the abutment.

For forming the swivel joint, the temples on the external leaf springs have joint elements in the form of loops, whereas on the connecting element, corresponding pivot pins are provided. When the temple is mounted, the pivot pins of the connecting element engage with the loops of the leaf springs.

In another embodiment, the pivot pins of the connecting element are designed approximately conically, such that they are received in concave opposite bearing shells, which are disposed on the external leaf springs, such that they can be pivoted.

The connecting element can be divided on its entire length into an upper bar and in a lower bar. The connecting element is thus divided through the frame to the lenses. Thus, an easy change of the lenses is possible, since in the case of dismounted temples the sides of the rim are easily pulled apart and thus, the glasses can be removed or changed.

These bars can possibly be fixed in a flexural resistant connection for achieving an additional stability by means of a sleeve which can be pushed over the connecting element of the respective temple before the temple is attached.

In another embodiment of the glasses frame, the external leaf springs are designed such that a spring resilience which is substantially applied in a direction of the joint axis for holding the joint elements of the external leaf springs and of the connecting element in a pivotable connection in a captivated manner.

Additionally, the resilience which is applied by the external leaf springs results in the fact that the bars are fastened relative to each other and the lenses are fixed in the respective sections of the frame without risk of loss. The leaf springs can easily be pulled apart against their resilience for detaching the temples from the connecting element and for making the rim accessible for changing the lenses.

According to one embodiment of the invention, it is provided that the length of the leaf springs and the length of the abutment are such that on the one hand, the spring resilience is sufficient for achieving a connection of the joint elements of the temple and of the connecting element such that it cannot be detached and on the other hand the leaf spring resilience is sufficient for holding the temple in its folded-up state. Furthermore, in the embodiment in which the connecting element has two bars, the lengths of the respective components are selected such that additionally the resilience is sufficient for holding together the two bars of the connecting element.

All components of the glasses frame can be fabricated in a preferred embodiment as stampings or blanks made of sheet metal, which subsequently are bent into the desired finished form. The use of titanium as material of the individual elements is also possible.

BRIEF DESCRIPTION OF THE DRAWINGS

These and other features and advantages will be better understood by reading the following detailed description, taken together with the drawings wherein:

FIG. 1 shows a perspective view of a temple and a rim of the glasses frame according to one embodiment of the invention in the folded-up state of the temple;

FIG. 2 shows a perspective view of the temple and of the rim of the glasses frame according to one embodiment of the invention in the folded-in state of the temple; and FIG. 3 shows a perspective exploded view of one part of the glasses frame according to one embodiment of the invention.

DETAILED DESCRIPTION

FIG. 1 shows an example of one part of the glasses frame according to one embodiment of the invention.

The glasses frame substantially includes a rim 1 and a temple 2. The temple 2 has three leaf springs 3, 4, and 5 on its end on the side of the rim which are parallel, that is, two external leaf springs 3 and 4 and a central leaf spring 5.

The rim 1 has a connecting element 6 on both sides, which extends in direction of the temple 2. The connecting element 6 is divided into an upper bar 7 and a lower bar 8.

As can be seen in FIG. 3, the division of the rim 1 extends to the lenses which are not represented herein. When the temple 2 is dismounted, the rim 1 can be slightly opened laterally by pulling apart the bars 7 and 8 for inserting or respectively changing the lenses.

The upper bar 7 and the lower bar 8 respectively have a pivot pin 9 which are respectively situated one above the other and thus form a pivot axis. In the mounted state, these pivot pins 9 engage with loops 10 which are respectively provided on the external leaf springs 3 and 4.

As can be seen from FIG. 3, the temple 2 is easily attached to the connecting element 6 by pulling apart the external leaf springs 3 and 4 and by inserting the pivot pins 9 in them. Due to the resilience of the external leaf springs 3 and 4 in direction of each other, the loops 10 provide a safe and pivotable locking over the pivot pin 9, whereby additionally the upper bar 7 and the lower bar 8 are fixed with each other in a flexural resistant connection.

The connecting element 6 has a section behind the pivot pin 9 which tapers in a direction of the temple 2 which forms a leaf-shaped abutment 11.

As can be seen in FIG. 1, the central leaf spring 5 in the folded-up state abuts on the surface of the abutment 11 which is not faced to the wearer of the glasses. When the glasses are folded in, as is shown in the FIG. 2, the central leaf spring 5 is supported by the abutment 11 for forming a resilience mechanism.

The abutment 11 has the same width as the central leaf spring 5 and is formed such that the external leaf springs 3 and 4 can be guided over the abutment 11 when the temple 2 is folded in.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A glasses frame comprising:
   temples on left and right sides, respectively;
   a rim including connecting element on the left and right sides, respectively, each of the connecting elements including an end on the side of the respective temple pointing in the direction of the temple in a folded-up state;
   three leaf springs on a rim end of each of the temples, a surface of the leaf springs being substantially coplanar with the respective connecting element when the respective temple is folded up;

joint elements disposed on each of the connecting elements, which cooperate with joint elements on external leaf springs of the three leaf springs such that a swivel joint is formed; and wherein each of the connecting elements includes a flat surface and a tapered section that tapers in a direction of the respective temple behind the joint elements, and wherein, during folding in, the tapered section of each of the connecting elements form an abutment for a central leaf spring of the three leaf springs of the respective temple.

2. The glasses frame according to claim 1 wherein the joint elements on the external leaf springs are disposed relative to the joint elements of the respective connecting elements such that when the respective temple is folded in, the external leaf springs of the temple are moving over the abutment of the connecting element.

3. A glasses frame comprising:
temples on left and right sides, respectively; and
a rim including connecting elements on the left and right sides, respectively, each of the connecting elements including an end on the side of the respective temple pointing in the direction of the temple in a folded-up state;
three leaf springs on a rim end of each of the temples, a surface of the leaf springs being substantially coplanar with the respective connecting element when the respective temple is folded up;
joint elements disposed on each of the connecting elements, which cooperate with joint elements on external leaf springs of the three leaf springs such that a swivel joint is formed; and
wherein each of the connecting elements provides an abutment for a central one of the three leaf springs of the respective temple when the temple is folded in, and wherein the joint elements at the external leaf springs are disposed relative to the joint elements of the respective connecting element such that when the respective temple is folded in, the external leaf springs of the temple are being moved over the abutment of the connecting element.

4. The glasses frame according to claim 3 wherein the joint elements of at least one of the connecting elements includes two pivot pins.

5. The glasses frame according to claim 4, wherein the external leaf springs of the respective temple include loops to engage with the pivot pins of the connecting element.

6. The glasses frame according to claim 3 wherein the joint elements of at least one of the connecting elements include two pivot pins.

7. The glasses frame according to claim 6, wherein the external leaf springs of the respective temple include bearing shells to engage the pivot pins of the connecting element.

8. The glasses frame according to claim 3 wherein the connecting element is divided into an upper bar and a lower bar on its entire length.

9. The glasses frame according to claim 8, wherein the division of the connecting element extends through the rim to lenses, which are received by the rim.

10. The glasses frame according to claim 8, further comprising a sleeve pushed over at least one of the connecting elements before the temple is connected to the connecting element.

11. The glasses frame according to claim 3 wherein all components are made of sheet metal and/or titanium.

12. The glasses frame according to claim 3 wherein the external leaf springs substantially have a resilience in the direction of the joint axis such that the joint elements of the temple and of the connecting element are attached in a pivotable connection in a captivated manner.

13. The glasses frame according to claim 12 wherein the resilience results from the spring tension which is applied by at least one of the external leaf springs acting in a direction toward the other of the leaf springs.

14. The glasses frame according to claim 12 wherein the length of the leaf springs of the temple and the length of the abutment are such that the resilience for achieving a connection where the joint elements of the temple and of the connecting element are captivated and the leaf spring resilience of the central leaf spring of the temple are sufficient for holding the temple in its folded-up state.

15. The glasses frame according to claim 12 wherein the length of the leaf springs of the temple and the length of the abutment are such that the resilience is sufficient for holding together the two bars of the connecting element, and wherein the leaf spring resilience of the central leaf spring of the temple is sufficient for holding the temple in its folded-up state.

16. A glasses frame for receiving lenses, comprising connecting elements disposed on left and right sides, respectively, for attaching a temple such that the temple is pivotable by means of joint elements disposed on the connecting element, wherein the connecting elements include flat surfaces and respectively extend in a direction of the temple, wherein the connecting elements taper behind the joint elements in a tapered section, the tapered section being narrower than a section with the joint elements, wherein the tapered section serves as an abutment for the temple when the temple is folded in.

* * * * *